US012573300B2

(12) United States Patent
Hashimoto et al.

(10) Patent No.: US 12,573,300 B2
(45) Date of Patent: Mar. 10, 2026

(54) VEHICLE DETECTION SYSTEM AND METHOD FOR DETECTING A TARGET VEHICLE IN A DETECTION AREA LOCATED BEHIND A SUBJECT VEHICLE

(71) Applicants: AUMOVIO Autonomous Mobility Germany GmbH, Ingolstadt (DE); TOYOTA JIDOSHA KABUSHIKI KAISHA, Toyota (JP)

(72) Inventors: Yuki Hashimoto, Singapore (SG); Takahiro Kohara, Toyota (JP); Tomohiko Mochizuki, Toyota (JP); Takayoshi Nohara, Toyota (JP); Masahiro Takahashi, Toyota (JP)

(73) Assignees: AUMOVIO Autonomous Mobility Germany GmbH, Ingolstadt (DE); TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 18/482,381

(22) Filed: Oct. 6, 2023

(65) Prior Publication Data

US 2024/0135822 A1 Apr. 25, 2024
US 2024/0233547 A9 Jul. 11, 2024

(30) Foreign Application Priority Data

Oct. 19, 2022 (EP) .................................... 22202538

(51) Int. Cl.
*G08G 1/16* (2006.01)

(52) U.S. Cl.
CPC .................................... *G08G 1/166* (2013.01)

(58) Field of Classification Search
None
See application file for complete search history.

(56) References Cited

U.S. PATENT DOCUMENTS 11,027,653 B2 6/2021 Kim et al.
2017/0057504 A1* 3/2017 Lee ........................ B60W 30/16
(Continued)

FOREIGN PATENT DOCUMENTS

CN 110435650 A 11/2019
JP 2019-116871 A 7/2019
(Continued)

OTHER PUBLICATIONS

Japanese Office Action dated Oct. 22, 2024 in Application No. 2023-175376.

*Primary Examiner* — Naeem Taslim Alam
(74) *Attorney, Agent, or Firm* — Sughrue Mion, PLLC

(57) ABSTRACT

A vehicle detection system, for detecting a target vehicle in a detection area located behind a subject vehicle, is configured to judge whether a target vehicle which has been detected to approach the subject vehicle occupying a driving lane from behind in a first adjacent lane which is on one side of the driving lane and which target vehicle has been further detected to change from the first adjacent lane by diagonally passing the driving lane on to a second adjacent lane on the other side of the driving lane, is an alert object, and output a result of judgement to warn a driver of the subject vehicle that a target vehicle is present behind the subject vehicle, and determine, on the basis of a change of a lateral overlap of the target vehicle in the detection area, an overlap change rate.

19 Claims, 2 Drawing Sheets

(56) References Cited

U.S. PATENT DOCUMENTS

| | | | | |
|---|---|---|---|---|
| 2018/0065623 | A1* | 3/2018 | Wodrich | B60W 30/06 |
| 2019/0100140 | A1* | 4/2019 | Takaki | G01S 13/867 |
| 2020/0207269 | A1 | 7/2020 | Acervo et al. | |
| 2020/0238904 | A1 | 7/2020 | Kim et al. | |
| 2020/0298887 | A1 | 9/2020 | Mukai | |
| 2020/0391733 | A1* | 12/2020 | Kumagai | B60W 10/18 |
| 2023/0161353 | A1* | 5/2023 | Liu | B60W 60/0011 701/25 |
| 2023/0322215 | A1* | 10/2023 | Patel | B60K 35/22 701/26 |
| 2024/0054901 | A1* | 2/2024 | Akimoto | B60W 60/0051 |
| 2024/0140423 | A1* | 5/2024 | Kobayashi | B60W 30/165 |
| 2025/0002016 | A1* | 1/2025 | Emoto | B60W 30/16 |

FOREIGN PATENT DOCUMENTS

| | | | |
|---|---|---|---|
| JP | 2019-174320 | A | 10/2019 |
| JP | 2020-523709 | A | 8/2020 |
| JP | 2020-147088 | A | 9/2020 |

* cited by examiner

VEHICLE DETECTION SYSTEM AND METHOD FOR DETECTING A TARGET VEHICLE IN A DETECTION AREA LOCATED BEHIND A SUBJECT VEHICLE

TECHNICAL FIELD

The invention relates to a vehicle detection system for detecting a target vehicle in a detection area located behind a subject vehicle. Furthermore, the invention relates to a method for detecting a target vehicle in a detection area located behind a subject vehicle, particularly for controlling a vehicle detection system.

Moreover, the invention relates to a driver assistance system for a vehicle, comprising such a vehicle detection system, a corresponding computer program for carrying out the method and a respective computer-readable medium.

BACKGROUND

Conventional Driver Assistance Systems or Advanced Driver Assistance Systems (ADAS) for vehicles are widely used, for example, in connection with conventional vehicles as well as autonomous vehicles.

Many vehicle accidents are caused by human error, which might have been avoided by means of such Advanced Driver Assistance Systems (ADAS). Commonly known safety-critical ADAS applications include pedestrian detection/avoidance, lane departure warning/correction, traffic sign recognition, automatic emergency braking and blind spot detection, for example. Long range radars are usually used for applications like emergency brake assist and adaptive cruise control, while short-range-radars are often employed in connection with applications like blind spot detection (BSD), rear-cross-traffic-alert, lane-change-assist and rear pre-crash systems, for example.

For example, such rear pre-crash systems track vehicles approaching from behind of a subject vehicle, for example, in a lane or driving lane of the subject vehicle or from an adjacent lane being adjacent to the lane of the subject vehicle and, in the event of an imminent collision, pre-activate safety devices such as indicators (optical or acoustic indicators), airbags, seat belts etc.

In case in such a system a target vehicle which approaches a subject vehicle from behind, is detected by radars which, for example, uses L-RTAN or Long-range Rear Approaching Target Notification for a long range detection area and RTAN or Rear Approaching Target Notification for a short range detection area, triggering of a warning signal by L-RTAN or by RTAN may be considered unnecessary if the target vehicle changes from a first adjacent lane which is adjacent to a driving lane of the subject vehicle to a second adjacent lane which is opposite to the first adjacent lane with respect to the driving lane and diagonally crosses the driving lane, for example, when the target vehicle is going to pass the subject vehicle. However, the estimation of a crossing the driving lane by the target vehicle, for example on the basis of Time-to-Exit (TTE), can be difficult and inaccurate, especially at large distances to the target vehicle. Thus the target vehicle may temporarily appear to merge in in the driving lane instead of continuously passing the driving lane. This behavior can erroneously lead to the target vehicle being regarded as a merge-in target vehicle and a warning signal triggered by RTAN and/or L-RTAN possibly being issued.

SUMMARY OF THE INVENTION

A vehicle detection system according to the invention is for detecting a target vehicle in a detection area located behind a subject vehicle, the vehicle detection system comprising judging means configured to judge whether a target vehicle which has been detected to approach the subject vehicle occupying a driving lane from behind in a first adjacent lane which is on one side of the driving lane and which target vehicle has been further detected to change from the first adjacent lane by diagonally passing the driving lane on to a second adjacent lane on the other side of the driving lane, is an alert object, to output a result of judgement to warning means which warns a driver of the subject vehicle that a target vehicle is present behind the subject vehicle based on the judging means judging the target vehicle to be an alert object, and to determine, on the basis of a change of a lateral overlap of the target vehicle in the detection area, an overlap change rate which represents the change in size of the lateral overlap over a specified time, wherein the judging means is configured to judge the target vehicle to be an alert object or to be not an alert object on the basis of the overlap change rate.

By using the overlap change rate, a very accurate determination and prediction of the actual line of travel of the target vehicle can be made while the target vehicle passes the driving lane while changing from the first adjacent lane to the opposite second adjacent lane. Consequently, unnecessary alarm warnings/activations can be avoided.

Advantageously, the judging means is configured to output a result of judgement to the warning means which result of judgement indicates to the warning means to suppress a warning even if a target vehicle has been detected, based on the judging means judging the target vehicle to be not an alert object.

Preferably, the detection area of the subject vehicle corresponds to a region of the driving lane of and behind the subject vehicle. The detection area may further comprise at least a region of the first adjacent lane and/or at least a region of the second adjacent lane.

Preferably, the lateral overlap of the target vehicle in the detection area is determined starting from a longitudinal reference line which the target vehicle crosses during its lane change from the first adjacent lane to the second adjacent lane and is measured in transverse direction.

Furthermore, the vehicle detection system may be configured such that the longitudinal reference line is a transition line at the side of the detection area.

Preferably, the judging means is configured to judge the target vehicle to be not an alert object if the lateral overlap of the target vehicle continuously increases during diagonally passing the driving lane.

Advantageously, the overlap change rate is defined as the difference between an actual lateral overlap and a previous lateral overlap divided by a cycle time of a determination cycle, in particular of a cycle time of 0.05 s. An overlap change rate warning threshold is set to be in the range of 1.0 m/s to 1.5 m/s and preferably 1.3 m/s and the judging means is further configured to judge the target vehicle to be not an alert object if the overlap change rate exceeds this overlap change rate warning threshold.

According to a preferred embodiment the judging means is further configured to determine a lateral TTE (Time-to-Exit) of the target vehicle for moving out of the driving lane, preferably by calculating the ratio of lateral overlap of the target vehicle to lateral velocity of the target vehicle, and is configured for the judgement carried out in repeated determination cycles whether TTE is lower than 4.0 s or TTE is 4.0 s or greater than 4.0 s and if TTE is lower than 4.0 s to set a delay timer on a minimum value between TTE and 1.5 s and to judge the target vehicle to be not an alert object (which means suppressing the warning signal), until delay timer is expired, and if TTE is 4.0 s or greater than 4.0 s to judge the target vehicle to be an alert object (which means not suppressing the warning signal).

Consequently, the vehicle detection system can be set up in such a way that a warning signal is temporarily suppressed for short duration if an overlap change of the target vehicle suddenly increases, in particular above a certain warning threshold.

A driver assistance system according to the invention is provided for a subject vehicle and comprises detecting means for detecting a target vehicle in a detection area located behind the subject vehicle, the vehicle detection system according to the invention as described above and warning means for warning a driver of the subject vehicle that a target vehicle is present in the detection area or in the driving lane only if the judging means of the vehicle detection system judged the target vehicle to be an alert object.

Moreover, the driver assistance system according to the invention can be further configured such that the detecting means comprises radar sensors for detecting a target vehicle in the detection area, in particular radar sensors for Rear Approaching Target Notification (RTAN) and for Long-range Rear Approaching Target Notification (L-RTAN). The judgement of the judging means may be based on either the L-RTAN radar detection or on RTAN radar detection or on both detections and is preferably based on the L-RTAN radar detection.

A vehicle according to the invention, preferably an autonomous vehicle, comprises a driver assistance system according to the invention as described above.

A computer-implemented method according to the invention is for detecting a target vehicle in a detection area located behind a subject vehicle, particularly for controlling a vehicle detection system according to the invention as described above, and comprises the following steps: judging whether a target vehicle which has been detected to approach the subject vehicle occupying a driving lane from behind in a first adjacent lane which is on one side of the driving lane and which target vehicle has been further detected to change from the first adjacent lane by diagonally passing the driving lane on to a second adjacent lane on the other side of the driving lane is an alert object, outputting a result of judgement to warning means which warns a driver of the subject vehicle that a target vehicle is present behind the subject vehicle based on the judging means judging the target vehicle to be an alert object, and determining, on the basis of a change of a lateral overlap of the target vehicle in the detection area, an overlap change rate which represents the change in size of the lateral overlap over a specified time, and judging the target vehicle to be an alert object or to be not an alert object on the basis of the overlap change rate.

Moreover, the method can be further modified such that the overlap change rate is defined as the difference between an actual lateral overlap and a previous lateral overlap divided by a cycle time of a determination cycle, in particular of a cycle time of 0.05 s.

Preferably, an overlap change rate warning threshold is set to be in the range of 1.0 m/s to 1.5 m/s and preferably 1.3 m/s. The judging means may further be configured to judge the target vehicle to be not an alert object if the overlap change rate exceeds this overlap change rate warning threshold.

Accordingly, the properties and advantages explained in connection with the vehicle detection system according to the invention arise in the same or similar manner in respect of the method for detecting a target vehicle in a detection area located behind a subject vehicle according to the present invention, which is why, in order to avoid repetitions, reference is made to the respective explanations with respect to the vehicle detection system according to the invention.

A computer program according to the present invention comprises instructions which, when the program is executed by a computer, cause the computer to carry out the method according to the present invention.

A non-transitory computer-readable medium according to the present invention has stored thereon the computer program according to the invention.

BRIEF DESCRIPTION OF THE DRAWINGS

Preferred embodiments and advantages of the invention will become more apparent upon reading the following detailed description along with the accompanying drawings in which.

DETAILED DESCRIPTION

With reference to the drawings, one preferred embodiment of the present invention will now be specifically described for illustrative purposes. It is to be understood that components or elements in this embodiment will be shown and described by way of examples only, but are not intended to limit this invention to them.

Figure 1:
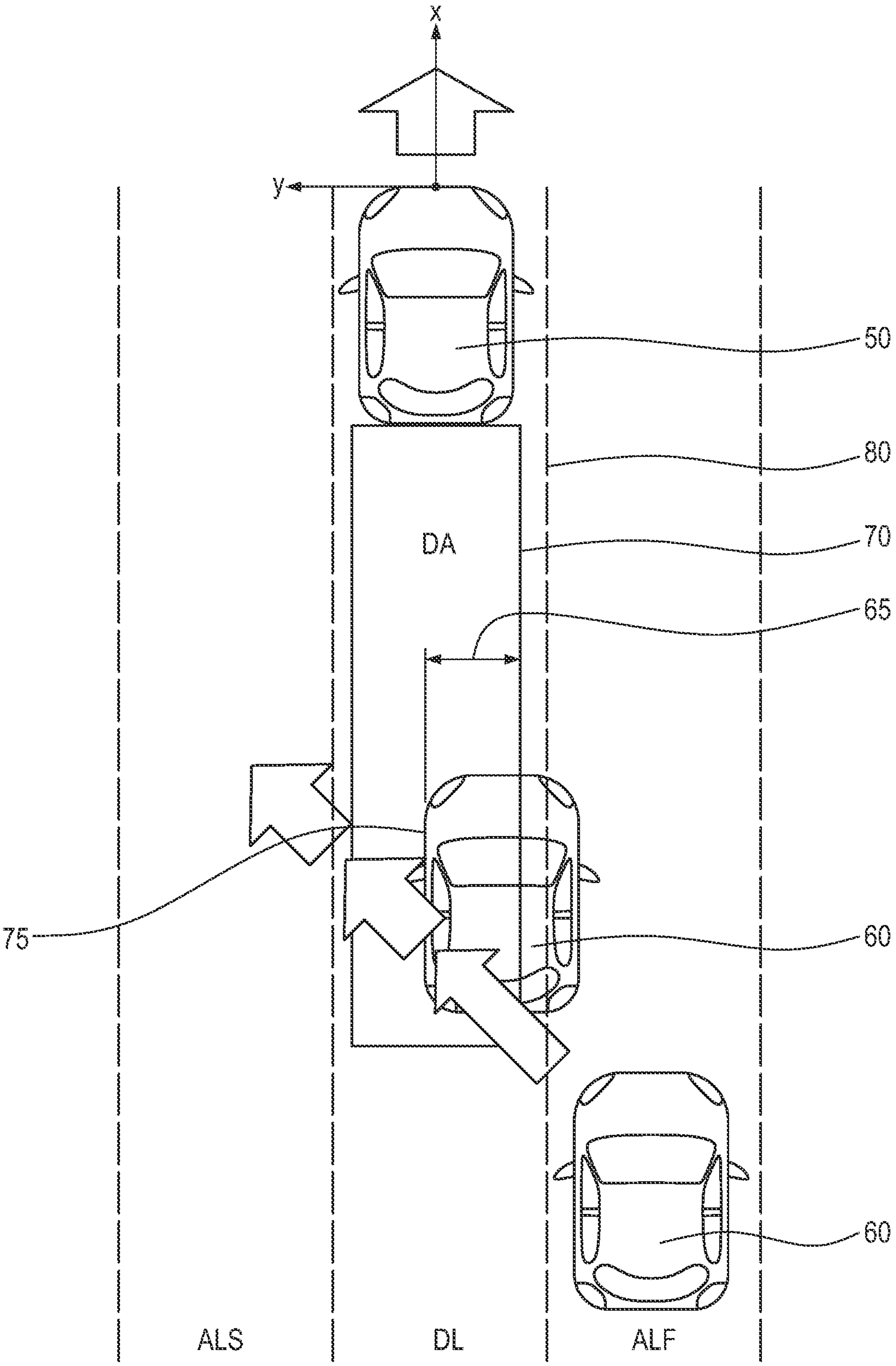
FIG. 1 shows a subject vehicle and a target vehicle which approaches the subject vehicle form behind and changes the lane, with the target vehicle shown in two positions.

FIG. 1 shows one embodiment of a vehicle or subject vehicle 50 according to the invention, which is provided with a driver assistance system 1 according to the invention which will be described in connection with FIG. 2.

Figure 2:
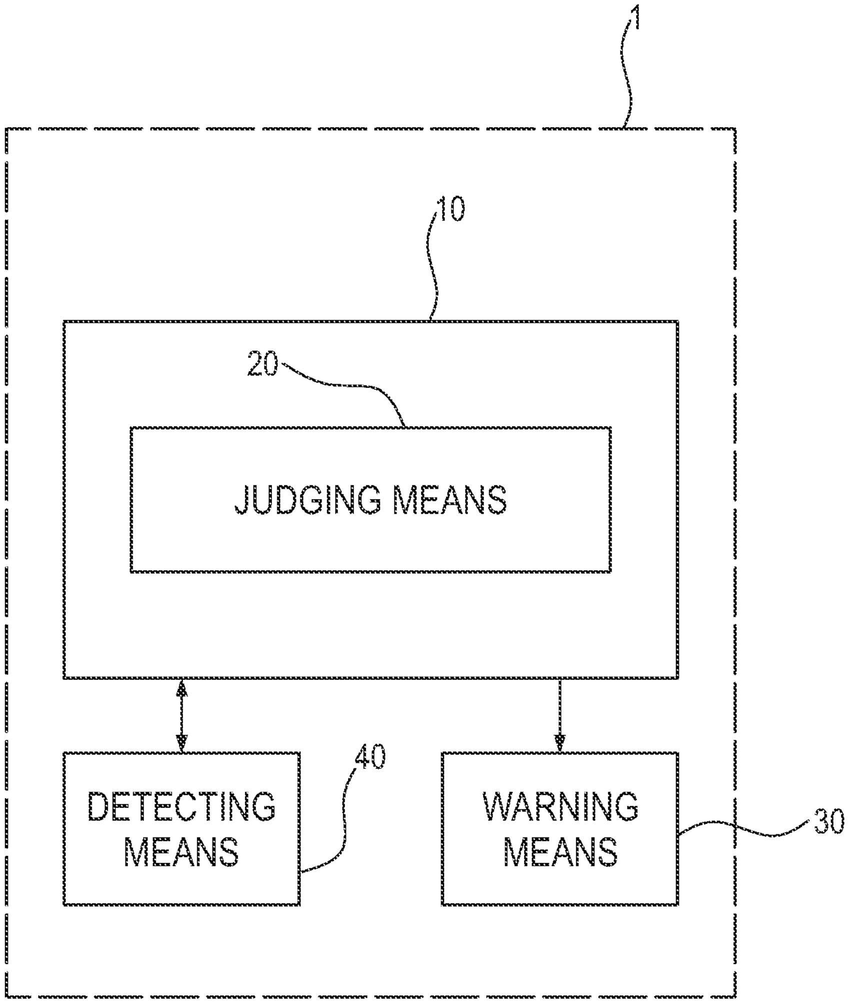
FIG. 2 shows a schematic configuration of a driver assistance system according to the invention.

As can be gathered from FIG. 2, the driver assistance system 1 provided in the subject vehicle 50 comprises a vehicle detection system 10 according to the invention, detecting means 40 and warning means 30.

The detecting means 40 is for detecting a target vehicle 60 in a detection area DA located behind the subject vehicle 50, which will be described below.

In this embodiment, the detecting means 40 comprises radar sensors for detecting a target vehicle 60 in the detection area DA. These sensors may be part of a conventional (rear-) cross-traffic alert system, for example, and are capable of detecting at least a relative position of the target vehicle 60 with respect to the subject vehicle 50, a relative speed/velocity of the target vehicle 60 with respect to the subject vehicle 50, respectively, in the x- and y-directions as shown in FIG. 1. In this case, the x-direction shown in FIG. 1 corresponds to the longitudinal direction of the subject vehicle 50 and the target vehicle 60, while the y-direction shown in FIG. 1 corresponds to the transverse direction of the subject vehicle 50 and the target vehicle 60.

Preferably, the detecting means 40 comprises radar sensors for Rear Approaching Target Notification (RTAN) and for Long-range Rear Approaching Target Notification (L-RTAN). The judgement of the judging means may be based on either the L-RTAN radar detection or on RTAN radar detection or on both detections.

The warning means 30 is for warning a driver of the subject vehicle 50 that a target vehicle 60 is present in the detection area DA. For example, the warning means 30 may be a conventional visual or audible indicator (display or speaker) capable of notifying the driver of the subject vehicle 50 that the target vehicle 60 is present in the detection area DA and, for example, may fall below a safety distance from the subject vehicle 50.

The vehicle detection system 10 according to the invention can be formed by a computer or processor and is in particular for detecting a target vehicle 60 in the detection area DA located behind the subject vehicle 50. The detection area DA of the subject vehicle 50 (FIG. 1) corresponds, in particular in the width or in the transverse direction, completely or to a certain extent to an area of the driving lane DL of the subject vehicle 50. The detection area DA may also comprise, completely or to a certain extent, the adjacent area or first adjacent lane ALF being located lateral/adjacent to the detection area DA or the driving lane DL and from which the target vehicle 60 starts for diagonally crossing the driving lane DL behind the subject vehicle 50. Moreover, the detection area DA may also comprise, completely or to a certain extent, the adjacent area or second adjacent lane ALS being located lateral/adjacent to the detection area DA or the driving lane DL and opposite to the first adjacent lane ALF with respect to the driving lane DL. The target vehicle 60 moves to this second adjacent lane ALS while crossing the driving lane DL.

The vehicle detection system 10 comprises judging means 20 for judging whether a target vehicle 60 which has been detected to enter the detection area DA is an alert object or not an alert object, and for outputting a result of judgement to the warning means 30.

While approaching the subject vehicle 50 from behind the target vehicle 60 changes from the first adjacent lane ALF to the driving lane DL and further to the second adjacent lane ALS, in particular when passing the subject vehicle 50 is intended.

When changing lanes, the target vehicle 60 occupies the detection area DA with a lateral overlap 65 of increasing size. The lateral overlap 65 is the distance in transverse or y-direction between a reference position or reference line 70 and a side part 75 of the target vehicle 60 which is within the driving lane DL and within the detection area DA and which is opposite to the reference line 70. This side part 75 of the target vehicle 60 is, for example, on the left side of the target vehicle 60 according to the representation in FIG. 1. The reference line 70 is, for example, the sideline of the detection area DA or the sideline or transition line 80 of the driving lane DL to the first adjacent lane ALF, dependent of the size or width of the detection area DA. The lateral overlap 65 therefore corresponds to the proportion of the target vehicle's width with which the target vehicle 60 is actually in the detection area DA. During lane change of the target vehicle 60 from the driving lane DL to the second adjacent lane ALS the size of the lateral overlap 65 increases, in particular continuously. This change of size of the lateral overlap 65 is detected by the detecting means 40.

The judging means 20 determines an overlap change rate on the basis of the changing lateral overlap 65 of the target vehicle 60 during lane change. Such, the overlap change rate represents the change in size of the lateral overlap 65 over time, for example, over a specified time like a cycle time of a determination cycle. The determination of the overlap change rate is carried out in cycles with a cycle time of 0.05 s, for example.

The overlap change rate is defined as the difference between an actual lateral overlap and a previous lateral overlap divided by the cycle time.

An overlap change rate warning threshold is set to be in the range of 1.0 m/s to 1.5 m/s and preferably 1.3 m/s. The judging means 20 is configured to judge the target vehicle 60 to be not an alert object if the overlap change rate exceeds this overlap change rate warning threshold while the target vehicle 60 enters the detection area DA and keeps this value of the overlap change rate warning threshold. Otherwise, the judging means 20 judges the target vehicle 60 to be an alert object.

If the overlap change rate exceeds this overlap change rate warning threshold the judging means 20 determines a lateral TTE (Time-to-Exit) of the target vehicle 60 for moving out of the detection area DA. TTE may be determined, for example, by calculating the ratio of lateral overlap of the target vehicle 60 to lateral velocity of the target vehicle 60 or may be evaluated in other ways, such as by simulation or experimentation. The judging means 20 further judges, in repeated determination cycles, whether TTE is lower than 4.0 s or TTE is 4.0 s or greater than 4.0 s.

If TTE is lower than 4.0 s a delay timer is set on a minimum value between TTE and 1.5 s and the target vehicle 60 is judged to be not an alert object until the delay timer is expired. In this case, a warning signal is suppressed for a maximum of 1.5 s before the delay timer is set again.

If TTE is 4.0 s or greater than 4.0 s the judging means 20 judges the target vehicle 60 to be an alert object.

Thus, the judging means 20 is configured to judge the target vehicle 60 to be an alert object or to be not an alert object on the basis of the overlap change rate during lane change while crossing the driving lane DL.

Accordingly, the warning means 30 warns the driver of the subject vehicle 50 that a target vehicle 60 is present in the detection area DA only if the judging means 20 judged the target vehicle 60 to be an alert object. In the other case, no warning is output. That is, the warning means 30 is configured to output a warning to the driver of the subject vehicle 50 that a target vehicle 60 is present in the detection area DA based on the judging means 20 judging the target vehicle 60 to be an alert object and to suppress output of a warning even if a target vehicle 60 is detected in the detection area DA by the detecting means 40 based on the judging means 20 judging the target vehicle 60 to be not an alert object.

The features of the invention disclosed in the foregoing description, in the drawings as well as in the claims may be essential for the realization of the invention both individually and in any combination.

The invention claimed is:

1. A vehicle detection system (10) for detecting a target vehicle (60) in a detection area (DA) located behind a subject vehicle (50), the vehicle detection system (10) comprising judging means (20) configured to judge whether the target vehicle (60) which has been detected to approach the subject vehicle (50) occupying a driving lane (DL) from behind in a first adjacent lane (ALF) which is on one side of the driving lane (DL) and which target vehicle (60) has been further detected to change from the first adjacent lane (ALF) by diagonally passing the driving lane (DL) on to a second adjacent lane (ALS) on the other side of the driving lane (DL), is an alert object, to output a result of judgement to a warning means (30) which warns a driver of the subject vehicle (50) that the target vehicle (60) is present behind the subject vehicle (50) based on the judging means (20) judging the target vehicle (60) to be an alert object, and to determine, on the basis of a change of a lateral overlap (65) of the target vehicle (60) in the detection area (DA), an overlap change rate which represents a change in size of the lateral overlap (65) over a specified time, wherein the judging means (20) is configured to judge the target vehicle (60) to be an alert object or to not be an alert object on the basis of the overlap change rate.

2. The vehicle object detection system (10) according to claim 1, wherein the detection area (DA) of the subject vehicle (50) corresponds to a region of the driving lane (DL) of and behind the subject vehicle (50), and in particular at least a region of the first adjacent lane (ALF) and/or at least a region of the second adjacent lane (ALS).

3. The vehicle detection system (10) according to claim 1, wherein the lateral overlap (65) of the target vehicle (60) in the detection area (DA) is determined starting from a longitudinal reference line (70) which the target vehicle (60) crosses during its lane change from the first adjacent lane (ALF) to the second adjacent lane (ALS) and which is measured in transverse direction.

4. The vehicle detection system (10) according to claim 3, wherein said longitudinal reference line (70) is a transition line (80) at the side of the detection area (DA).

5. The vehicle detection system (10) according to claim 1, wherein the judging means (20) is configured to judge the target vehicle (60) to not be an alert object if the lateral overlap (65) of the target vehicle (60) continuously increases while diagonally passing the driving lane (DL).

6. The vehicle detection system (10) according to claim 1, wherein the judging means (20) is configured to output the result of judgement to the warning means (30) which result of judgement indicates to the warning means (30) to suppress a warning even if a target vehicle (60) has been detected, based on the judging means (20) judging the target vehicle (60) to not be an alert object.

7. The vehicle detection system (10) according to claim 1, wherein the overlap change rate is defined as the difference between an actual lateral overlap and a previous lateral overlap divided by a cycle time of a determination cycle, in particular of a cycle time of 0.05 s, and an overlap change rate warning threshold is set to be in the range of 1.0 m/s to 1.5 m/s and the judging means (20) is further configured to judge the target vehicle (60) to not be an alert object if the overlap change rate exceeds this overlap change rate warning threshold.

8. The vehicle detection system (10) according to claim 1, wherein the judging means (20) is further configured to determine a lateral TTE (Time-to-Exit) of the target vehicle (60) for moving out of the driving lane (DA) and is configured for the judgement carried out in repeated determination cycles whether TTE is lower than 4.0 s or TTE is 4.0 s or greater than 4.0 s and if TTE is lower than 4.0 s to set a delay timer on a minimum value between TTE and 1.5 s and to judge the target vehicle (60) to not be an alert object until the delay timer is expired, if TTE is 4.0 s or greater than 4.0 s to judge the target vehicle (60) to be an alert object.

9. A driver assistance system (1) for a subject vehicle (50), comprising:

detecting means (40) for detecting the target vehicle (60) in a detection area (DA) located behind the subject vehicle (50), a vehicle detection system (10) according to claim 1, and warning means (30) for warning a driver of the subject vehicle (50) that a target vehicle (60) is present in the detection area (DA) or in the driving lane (DL) only if the judging means (20) of the vehicle detection system (10) judged the target vehicle (60) to be an alert object.

10. The driver assistance system (1) according to claim 9, wherein the detecting means (40) comprises radar sensors for detecting the target vehicle (60) in the detection area (DA), in particular radar sensors for Rear Approaching Target Notification (RTAN) and for Long-range Rear Approaching Target Notification (L-RTAN).

11. An autonomous vehicle, comprising a driver assistance system (1) according to claim 9.

12. A computer-implemented method for detecting a target vehicle (60) in a detection area (DA) located behind a subject vehicle (50), wherein the method comprises the following steps:

judging whether the target vehicle (60) which has been detected to approach the subject vehicle (50) occupying a driving lane (DL) from behind in a first adjacent lane (ALF) which is on one side of the driving lane (DL) and which target vehicle (60) has been further detected to change from the first adjacent lane (ALF) by diagonally passing the driving lane (DL) on to a second adjacent lane (ALS) on the other side of the driving lane (DL), is an alert object, outputting a result of judgement to a warning means (30) which warns a driver of the subject vehicle (50) that the target vehicle (60) is present behind the subject vehicle (50) based on the judging means (20) judging the target vehicle (60) to be an alert object, and determining, on the basis of a change of a lateral overlap (65) of the target vehicle (60) in the detection area (DA), an overlap change rate which represents a change in size of the lateral overlap (65) over a specified time, and judging the target vehicle (60) to be an alert object or to not be an alert object on the basis of the overlap change rate.

13. The method according to claim 12, wherein the overlap change rate is defined as the difference between an actual lateral overlap and a previous lateral overlap divided by a cycle time of a determination cycle, in particular of a cycle time of 0.5 s.

14. The method according to claim 13, wherein an overlap change rate warning threshold is set to be in the range of 1.0 m/s to 1.5 m/s and the judging means (20) is further configured to judge the target vehicle (60) to not be an alert object if the overlap change rate exceeds this overlap change rate warning threshold.

15. A non-transitory computer-readable medium having stored thereon a computer program comprising instructions which, when the program is executed by a computer, cause the computer to carry out the method of claim 12.

16. The vehicle detection system (10) according to claim 7, wherein the overlap change rate warning threshold is set to be 1.3 m/s.

17. The vehicle detection system (10) according to claim 8, wherein the judging means (20) determines the lateral TTE (Time-to-Exit) of the target vehicle (60) for moving out of the driving lane (DA) by calculating a ratio of lateral overlap of the target vehicle (60) to lateral velocity of the target vehicle (60).

18. The driver assistance system (1) according to claim 10, wherein the judgement of the judging means (20) is based on the L-RTAN radar detection.

19. The method according to claim 14, wherein the overlap change rate warning threshold is set to be 1.3 m/s.

* * * * *